Oct. 6, 1931.  F. L. MORSE  1,825,675

POWER TRANSMISSION CHAIN

Filed May 17, 1928

INVENTOR
Frank L. Morse
BY
Synnestvedt & Lechner
ATTORNEYS

Patented Oct. 6, 1931

1,825,675

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

POWER TRANSMISSION CHAIN

Application filed May 17, 1928. Serial No. 278,424.

This invention relates to improvements in drive chains and particularly to improvements in the joints thereof.

The primary object of my invention is to provide a simple form of drive chain in which tendency of the chain to whip is minimized.

Another object of my invention is the provision of a chain in which wear in the joints is automatically compensated for.

How the foregoing, together with such other objects and advantages as may hereinafter appear, or are incident to my invention, are realized, is illustrated in preferred form in the accompanying drawings, wherein—

Figure 1:
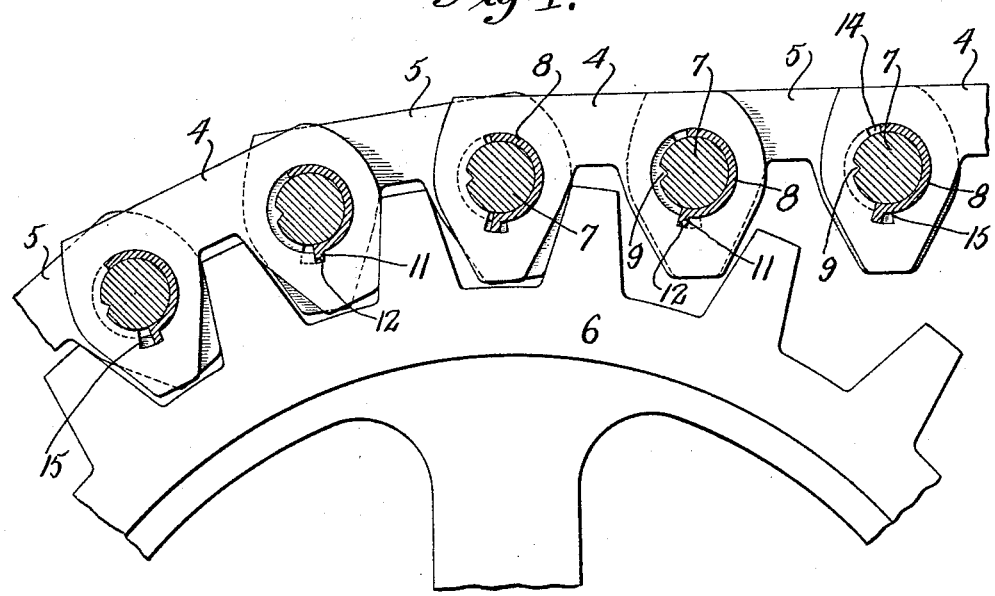
Fig. 1 is a longitudinal section through a portion of a chain constructed in accordance with my invention.
Figure 2:
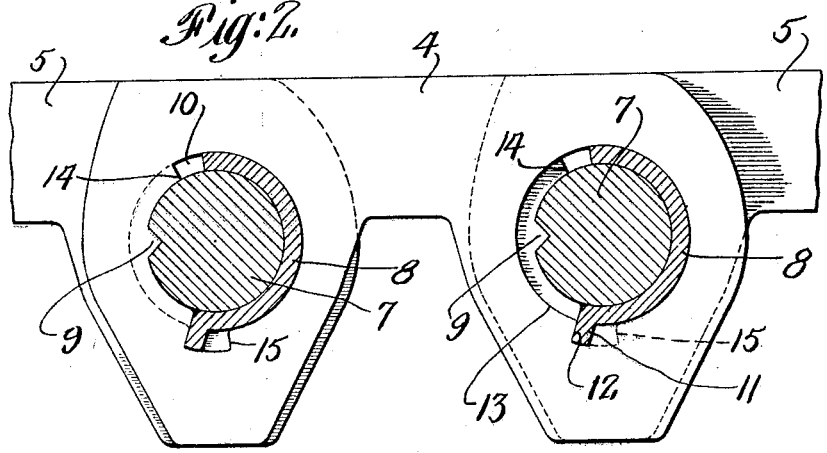
Fig. 2 is an enlarged longitudinal section clearly illustrating the construction of my improved joints.
Figure 3:
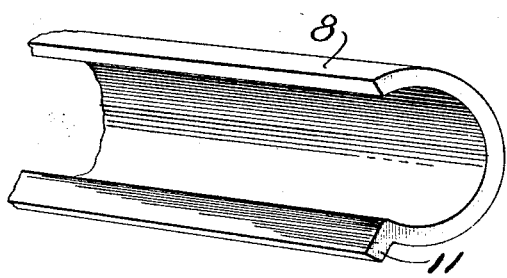
Fig. 3 is a fragmentary perspective view of the improved bush which I employ.

Referring to the drawings, it will be seen that the links 4, 5, of the chain are each comprised of a plurality of flat plates adapted to arch over the teeth of the sprocket wheel 6 after the manner of known multiplate drive chains. The plates of adjoining links are connected together by joints or pintles comprising two parts, a cylindrical pin 7 and a bush 8, which parts extend through apertures in the overlapping plates of the links.

The bushes 8 are somewhat more than semi-circular and are constructed of spring metal the tension of which is in a direction tending to reduce the radius of the bush, i. e., normally the bushes have a gripping action on the pins 7.

The cylindrical pins 7 are secured against rotation, as by means of key means 9, in the apertures 10 at one end of the links and the bushes 8 are secured against rotation, as by means of the projections 11 on the bushes and the grooves or slots 12 in the apertures 13 at the other end of the links. Thus, considering any one joint, it will be seen that the pin 7 is secured against rotation in the plates of one link and that the bush 8 is secured against rotation in the overlapping plates of the adjacent link. The apertures in which the pins 7 are secured are of such form as to provide clearance for the bushes at 14 and 15 to permit of articulation of the chain. The apertures in which the bushes 8 are secured are not provided with key means 9.

The action of the joint in minimizing the tendency for the chain to whip is as follows: As the bushes 8 are more than a semi-circle in cross section and as they are constructed of spring metal as above pointed out, there is a tendency of the bushes to have a winding up action, so to speak, as adjacent links move relative to one another in one direction. This action causes the bush to grip the cylindrical pin, more or less, with the result that influences tending to cause whipping of the chain are resisted.

On movement of the links relative to one another in the opposite direction, there is a tendency for the bush to loosen its grip on the pin, but this does not destroy the functioning of my improved joint as a whip preventing means, because I have found that whip in chains can be overcome by breaking up the rythmatic action of the chain, and this is accomplished even though resistance to whipping influences is only offered during relative movement of the links in one direction.

The spring action referred to, in addition to minimizing whipping of the chain, also serves as a means to automatically compensate for wear in the joint for the reason that as wear between the bushes and pins takes place, it is compensated for by the bushes closing in on the pins.

I claim:—

1. A chain comprising, in combination, a series of links composed of plates, and joints for said links comprising cylindrical pins secured against rotation in apertures at one end of the links, spring bushes, means for securing said bushes in apertures at the other end of the links, comprising projecting means on the bushes, and means for receiving said projecting means in the apertures in which the bushes are secured.

2. A chain comprising, in combination, a series of links composed of plates, and a joint for said links comprising a cylindrical pin secured against rotation in the plates of one link, and a yieldable split bushing secured at one end against rotation in the overlapping plates of the adjacent link and being free at its other end.

3. A chain comprising, in combination a series of links composed of plates, and a joint for said links comprising a cylindrical pin, means for securing said pin against rotation in the plates of one link, a yieldable split bushing, and means at one end of said bushing for securing it against rotation in the overlapping plates of the adjacent link, the other end of the bushing being free, said bushing tending to increase its grip on the pin as the links have relative movement in one direction and tending to loosen its grip on relative movement of the links in another direction.

4. A chain comprising, in combination, a series of links composed of plates, and a joint for said links comprising a cylindrical pin, means for securing said pin against rotation in the plates of one link, a split spring metal bushing the tension of which is in a direction tending to reduce its radius, and means at one end of said bushing for securing it against rotation in the overlapping plates of the adjacent link, said bushing being free at its other end.

In testimony whereof I have hereunto signed my name.

FRANK L. MORSE.